United States Patent
Hirsch et al.

(10) Patent No.: US 7,348,081 B2
(45) Date of Patent: Mar. 25, 2008

(54) FUEL EFFICIENT MEMBRANE ELECTRODE ASSEMBLY

(75) Inventors: Robert S. Hirsch, Troy, NY (US); Juan J. Becerra, Altamont, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 563 days.

(21) Appl. No.: 10/449,271

(22) Filed: May 30, 2003

(65) Prior Publication Data

US 2004/0241529 A1    Dec. 2, 2004

(51) Int. Cl.
*H01M 8/00* (2006.01)
*H01M 4/00* (2006.01)

(52) U.S. Cl. .............. 429/12; 429/40; 429/27

(58) Field of Classification Search ......... 429/12, 429/27, 40, 30
See application file for complete search history.

(56) References Cited

U.S. PATENT DOCUMENTS

| | | | |
|---|---|---|---|
| 5,599,638 A * | 2/1997 | Surampudi et al. ......... 429/33 |
| 5,631,099 A * | 5/1997 | Hockaday ............... 429/30 |
| 6,296,964 B1 * | 10/2001 | Ren et al. ............... 429/38 |
| 6,303,244 B1 | 10/2001 | Surampudi et al. |
| 6,350,540 B1 | 2/2002 | Sugita et al. |
| 6,365,293 B1 | 4/2002 | Isono et al. |
| 6,399,202 B1 | 6/2002 | Yu et al. |
| 6,420,059 B1 | 7/2002 | Surampudi et al. |
| 6,730,363 B1 | 5/2004 | Shah et al. |
| 2002/0076599 A1 | 6/2002 | Neutzler et al. |
| 2003/0013004 A1 * | 1/2003 | Oyanagi et al. ............. 429/40 |

FOREIGN PATENT DOCUMENTS

WO    WO 03/077345 A1 *    9/2003

OTHER PUBLICATIONS

Maynard, Helen L. and Jeremy P. Meyers, Miniaturized Fuel Cells for Portable Power, Prepared for presentation at the conference on Small Fuel Cells and Battery Technologies 2000, Apr. 27-28, 2000, New Orleans, LA, all pages.
United States Reissued Patent No.: US RE37,656 E, Date of Reissued Patent: Apr. 16, 2002, by Bahar et al. for an Electrode Apparatus Containing an Integral Composite Membrane, all pages.
www.fuelcellstore.com, homepage, http://www.fuelcellstore.com/, 2005, pp. 1.
www.fuelcellstore.com, Silicon Gasketing search results, http://www.fuelcellstore.com/cgi-bin/fuelweb/view-SearchResults/command-LogSearch?. . . , 2005, pp. 1.

* cited by examiner

*Primary Examiner*—Tracy Dove
*Assistant Examiner*—Helen Chu
(74) *Attorney, Agent, or Firm*—Cesari and McKenna LLP

(57) ABSTRACT

The present invention provides a fuel efficient membrane electrode assembly that substantially resists methanol from "crossing over" by sealing the anode diffusion layer and catalyst layer, and by preventing fluids from passing across at least a portion of the membrane electrolyte. The efficiency of the fuel cell is maintained because essentially all of the fuel is reacted on the catalyst layers creating electricity, which is transferred to the fuel cell load. The temperature of the fuel cell is also maintained as the uncatalyzed reaction that produces heat is prevented.

24 Claims, 8 Drawing Sheets

AREA BETWEEN THE BOLD LINES
IS THE SEALED AREA

AREA BETWEEN THE BOLD LINES
IS THE SEALED AREA

FUEL EFFICIENT MEMBRANE ELECTRODE ASSEMBLY

BACKGROUND OF THE INVENTION

1. Field of the Invention

This invention relates generally to direct oxidation fuel cells, and more particularly, to components for managing fluids within such fuel cells.

2. Background Information

Fuel cells are devices in which electrochemical reactions are used to generate electricity. A variety of materials may be suited for use as a fuel depending upon the nature of the fuel cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell) or "direct oxidation" systems in which the fuel is fed directly into the cell without the need for separate internal or external processing. Most currently available fuel cells are reformer-based fuel cell systems. However, because fuel processing is complex, and requires expensive components, which occupy comparatively significant volume, the use of reformer based systems is presently limited to comparatively large, high power applications.

Direct oxidation fuel cell systems may be better suited for a number of applications in smaller mobile devices (e.g., mobile phones, handheld and laptop computers), as well as in some larger scale applications. In direct oxidation fuel cells of interest here, a carbonaceous liquid fuel in an aqueous solution (typically aqueous methanol) is applied to the anode face of a membrane electrode assembly (MEA). The MEA contains a protonically conductive, but electronically non-conductive membrane (PCM). Typically, a catalyst, which enables direct oxidation of the fuel on the anode aspect of the PCM, is disposed on the surface of the PCM (or is otherwise present in the anode chamber of the fuel cell). In the fuel oxidation process at the anode, the products are protons, electrons and carbon dioxide. Protons (from hydrogen in the fuel and water molecules involved in the anodic reaction) are separated from the electrons. The protons migrate through the PCM, which is substantially impermeable to the electrons. The electrons travel through an external circuit, which includes the load, and are united with the protons and oxygen molecules in the cathodic reaction, thus providing electrical power from the fuel cell.

One example of a direct oxidation fuel cell system is a direct methanol fuel cell system or DMFC system. In a DMFC system, a mixture comprised predominantly of methanol and water is used as fuel (the "fuel mixture"), and oxygen, preferably from ambient air, is used as the oxidizing agent. The fundamental reactions are the anodic oxidation of the methanol and water in the fuel mixture into $CO_2$, protons, and electrons; and the cathodic combination of protons, electrons and oxygen into water. The overall reaction may be limited by the failure of either of these reactions to proceed at an acceptable rate (more specifically, slow oxidation of the fuel mixture will limit the cathodic generation of water, and vice versa).

Direct methanol fuel cells are being developed towards commercial production for use in portable electronic devices. Thus, the DMFC system, including the fuel cell and the other components should be fabricated using materials and processes that not only optimize the electricity-generating reactions, but which are also cost effective. Furthermore, the manufacturing process associated with a given system should not be prohibitive in terms of associated labor or manufacturing cost or difficulty.

Typical DMFC systems include a fuel source, fluid and effluent management and air management systems, and a direct methanol fuel cell ("fuel cell"). The fuel cell typically consists of a housing, hardware for current collection and fuel and air distribution, and a membrane electrode assembly ("MEA") disposed within the housing.

A typical MEA includes a centrally disposed, protonically conductive, electronically non-conductive membrane ("PCM"). One example of a commercially available PCM is NAFION® a registered trademark of E.I. Dupont de Nemours and Company, a cation exchange membrane comprised of polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the anode face of the PCM, while allowing the gaseous product of the reaction, typically carbon dioxide, to move away from the anode face of the PCM. In the case of the cathode side, a diffusion layer is used to achieve a fast supply and even distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM.

The diffusion layers are conventionally fabricated of carbon paper or a carbon cloth, typically with a thin, porous coating made of a mixture of carbon powder and TEFLON®. Such carbon paper or carbon cloth components allow a relatively high flux of methanol when immersed in a liquid methanol and water fuel mixture. While some methanol access through the anode diffusion layer is required for maintaining anode, and therefore, cell current, a high flux of methanol through the anode diffusion layer is a shortcoming because most presently available membrane electrolytes suitable for use in a DFMC system are typically permeable to methanol and concentrated fuel which, if introduced into the anode chamber, can thus pass at a significant rate through the diffusion layer and the membrane and oxidize on the cathode face of the membrane. This results in wasted fuel as well as diminished cathode performance, leading to diminished performance of the fuel cell and fuel cell system.

Traditional DMFC structures have required that the diffusion layers perform a current conduction function as well as managing the introduction and removal of reactants and products within the MEA. Thus, these layers have had to be electrically conductive, as well as capable of managing the transport of liquids and gasses within the MEA, i.e., transport reactants to and products away from the catalyst coated PCM. Diffusion layers used in fuel cells are comprised of porous carbon paper or carbon cloth, typically between 100-500 microns thick. Each of these diffusion layers is typically "wet-proofed" with TEFLON® or otherwise treated in a manner that makes the diffusion layer hydrophobic to prevent liquid water from saturating the diffusion layer. Such "wet-proofing" may not be ideal for the anode of a DMFC or other direct oxidation fuel cell system.

A metallic diffusion layer or a metallic diffusion layer combined with a flow field plate in a direct oxidation fuel cell has been described for use as a controlled methanol transport barrier. The metallic layer component can be manufactured using particle diffusion bonding techniques as described in commonly owned U.S. patent application Ser. No. 09/882,699 which was filed on Jun. 15, 2001, for a METALLIC LAYER COMPONENT FOR USE IN A DIRECT OXIDATION FUEL CELL.

Those skilled in the art will recognize that materials other than metals may offer advantages for certain architectures or designs. For example, many polymers are less expensive, and easier to mold or form into a desired structure than metals, provided that there are alternate structures and methods in place to collect current and provide other desired characteristics. In addition, the use of polymers allow for precise engineering of the size and shape of the pores in the component, and may be further desirable as it is possible to utilize a liquid impermeable polymer.

As noted, the MEA is formed of a PCM to which a catalyst is applied, forming a catalyst coated membrane (CCM). Diffusion layers are pressed onto the CCM. Generally, the entire MEA is held in place by a frame comprised of a faceplate that is disposed on each of the anode side and the cathode side. The faceplates provide an electron path while also providing compression to the MEA. The faceplates also physically connect the MEA to the fuel cell system. It is common to make the diffusion layers and catalyst layers the same dimensions as the openings of the frame. Fluid leaks are resisted by gaskets that are placed between the faceplates, around the MEA. However, this is not always successful, as there is an another path, around the diffusion layers, and across the catalyst layer, through which fuel may pass or leak from the anode to the cathode side of the PCM. This fuel crosses over the membrane, resulting in methanol cross over. The fuel is thus wasted as it does not contribute to the electricity generating reactions. Instead, it oxidizes on the cathode aspect of the MEA, thus creating heat. Excess heat can result in changes in the behavior of the NAFION® membrane, thus reducing fuel cell efficiency. Alternatively, the fuel can simply remain on the cathode aspect of the PCM also reducing fuel cell efficiency.

There remains a need, therefore, for an improved membrane electrode assembly in which undesirable leaks across or around the diffusion layers and/or the catalyst or other components are eliminated, without adding unnecessary bulk and weight to the fuel cell, and fuel cell system.

It is thus an object of the present invention to enhance fuel cell efficiency by eliminating possible paths for fluid to leak from the anode to the cathode of an MEA.

SUMMARY OF THE INVENTION

The disadvantages of prior techniques are overcome by the solutions provided by the present invention, which include techniques for increasing fuel efficiency in a direct oxidation fuel cell by preventing fuel leakage around the anode diffusion layer and/or the catalyst coating on the anode face of the membrane electrolyte. The techniques of the present invention substantially resist fuel from flowing in undesired paths from or around the anode to the cathode side of the MEA without generating electricity, thereby maintaining the efficiency of the fuel cell. This may be accomplished in accordance with a number of different embodiments of the invention described in further detail herein but which either render a portion of the membrane electrolyte substantially impermeable to methanol and water, and/or physically prevent fuel from leaking around the diffusion layers and other components.

For purposes of clarity of illustration, we have herein described an embodiment of the invention having a fuel cell that includes a diffusion layer on the cathode side of the cell and a diffusion layer on the anode side. The fuel cell, however, may also include combinations of other layers, components, and/or membranes, which elements may control or manage the substances in the cell (fuel, water, carbon dioxide and oxygen) in a number of different variations. It is expressly contemplated that one or more of such elements may also, or alternatively, be included in the sealing techniques of the present invention (such as, for example, by being extended under the gasketing) to prevent undesired leakage, in accordance with the invention and while remaining within the scope of the present invention.

In accordance with a first aspect of the invention the chemical composition of the a portion of the PCM, such as a peripheral area of the PCM, beyond the catalyst coating, is rendered substantially impermeable to fuel, and/or ionically non-conductive. This means that neither fuel nor water will be able to pass through the impermeable areas of the PCM, forcing fuel to flow through the catalytic coating and resulting in electricity-generating reactions, and thus increasing fuel efficiency.

In accordance another aspect of the invention, the diffusion layers are extended beyond the impermeable area of the PCM, forming a seal. This substantially prevents the fuel solution from leaking between the edges of the diffusion layers and the membrane electrolyte. Even though the anode diffusion layer allows the fuel solution to be introduced to the impermeable area of the PCM it acts as a physical barrier, thus reducing the amount of fuel solution to only that which diffuses across the anode diffusion layer.

In accordance with another aspect of the invention, the catalytic layers are extended. This also substantially resists the flow of fuel substance through the aforementioned path by providing catalytic area for fuel passing through the anode diffusion layer and consequently the methanol or other fuel substance is oxidized on the catalyst. It also provides a catalytic surface for fuel that may have escaped the anode diffusion layer. In most cases, the first and second aspects will be combined in the fuel cell system.

Further, in accordance with yet another aspect of the invention, a fuel impermeable material, such as TEFLON®, is painted or otherwise applied to a portion of the PCM such as the outer edges forming a border around the PCM in such a fashion that it overlays the edge of the active catalyst area. Alternatively, a plastic gasketing can be used to create the seal. The edges of the associated anode diffusion layer typically extend at least to the TEFLON® or the gasketing and this creates a seal between the catalyst and the PCM. In addition, it may be desirable to apply such a fuel impermeable material in such a fashion that it "seals" the diffusion layer and catalyst layer to the PCM so that fuel does not escape from the diffusion layer to the PCM.

The aspects of the present invention can be combined in various ways with other aspects of the present invention in a fuel cell system, while remaining within the scope of the present invention. In addition, other designs and architectures, in which it is desirable to manage the flow of fuel to a protonically conductive membrane electrolyte are within the scope of the invention.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
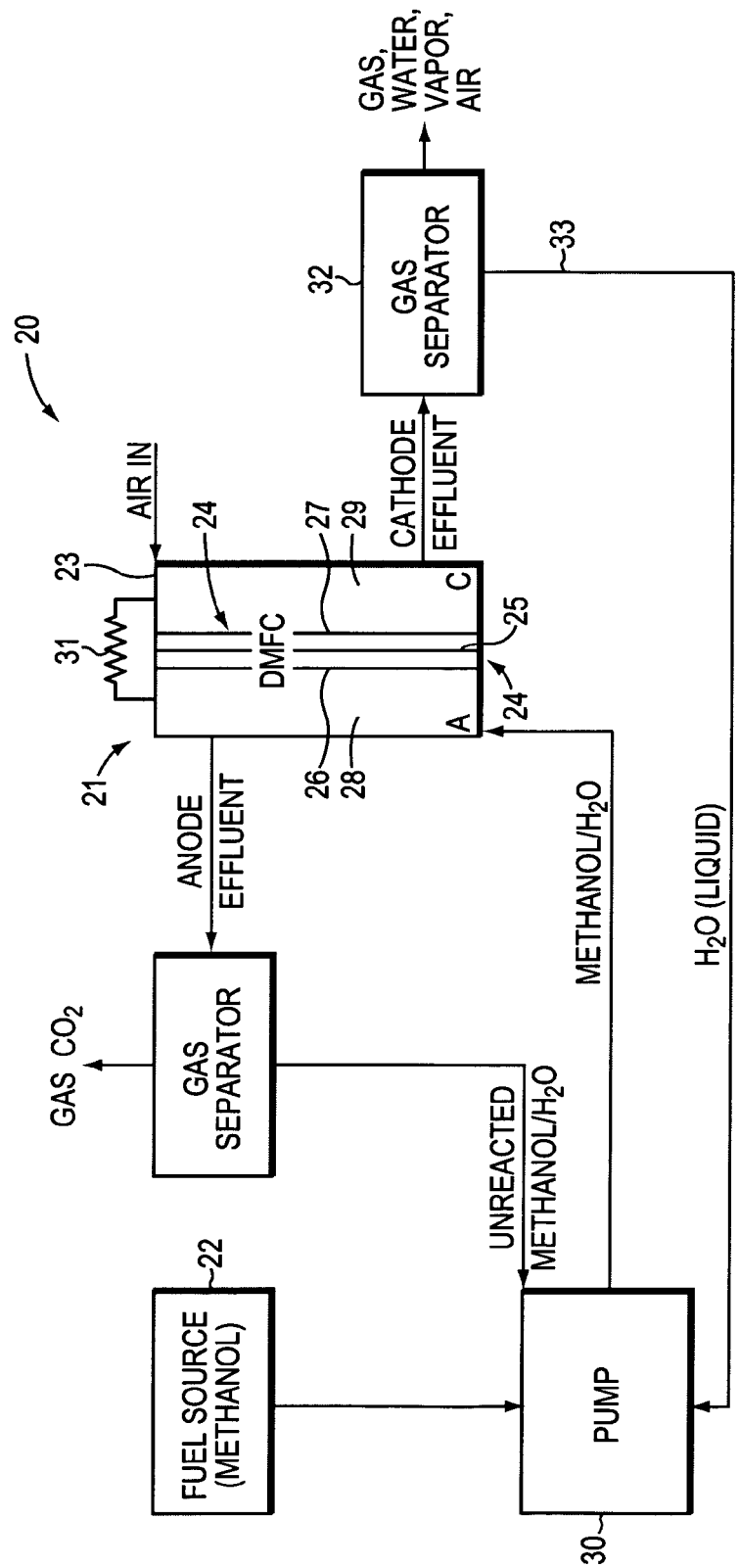
FIG. 1 is a schematic diagram of a DMFC system in which the present invention can be employed.

An example of a direct oxidation fuel system 20 is schematically illustrated in FIG. 1. The fuel cell system 20 includes a direct oxidation fuel cell, which may be a direct methanol fuel cell 21 ("DMFC"), for example. For purposes of illustration, and not by way of limitation, we herein describe an illustrative embodiment of the invention with DMFC 21, and a DMFC system with the fuel substance being methanol or an aqueous methanol solution. However, it is within the scope of the present invention that other carbonaceous fuels such as ethanol, or combinations of carbonaceous fuels and aqueous solutions thereof may be used. It should be further understood that the invention is applicable to any fuel cell system where it is preferable to introduce a liquid fuel, vaporous fuel or component thereof to the anode aspect 26 of a membrane electrode assembly (MEA) 24 in the manner described herein, and is not limited to the embodiment described in FIG. 1. It should thus be understood that while the invention may be implemented in the system illustrated in FIG. 1, it is equally applicable and can be readily employed in other architectures that include a DMFC that has a protonically conductive, electronically non-conductive membrane as well DMFC systems and/or direct oxidation fuel cell stacks.

The system 20, including the DMFC 21, has a fuel delivery system to deliver fuel from fuel source 22, which may be a fuel reservoir or fuel cartridge. The DMFC 21 includes a housing 23 that encloses an MEA 24. MEA 24 incorporates protonically conductive, electronically non-conductive, membrane (PCM) 25, and typically includes at least one diffusion layer in contact with one or both aspects of the PCM 25. PCM 25 has an anode face 26 and cathode face 27, each of which may be coated with a catalyst, including but not limited to platinum, or a blend of platinum and ruthenium, or combinations thereof and alloys thereof. Diffusion layers are usually fabricated from carbon cloth or carbon paper that are treated with a mixture of TEFLON® and high surface area carbon particles, are typically provided in intimate contact with the catalyzed faces of each of the anode 26 and cathode 27 aspects of the PCM 25, though the invention is not limited to systems that require diffusion layers. The portion of DMFC 21 defined by the housing 23 and the anode face 26 of the PCM 25 is referred to herein as the anode chamber 28. The portion of DMFC 21 defined by the housing 23 and the cathode face 27 of the PCM 25 is referred to herein as the cathode chamber 29. The anode chamber 28 and cathode chamber 29 may further contain a flow field plate or plates (not shown) in contact with the diffusion layer, in order to manage the mass transport of reactants and products of the reaction. The anode chamber 28 may also include a methanol delivery film which may be a pervaporation membrane that changes a liquid fuel to a vaporous fuel, as is described in commonly-owned U.S. patent application Ser. No. 10/413,983 for a DIRECT OXIDATION FUEL CELL OPERATING WITH DIRECT FEED OF CONCENTRATED FUEL UNDER PASSIVE WATER MANAGEMENT, filed on Apr. 15, 2003, which is presently incorporated herein by reference. Water management components may also be included in either the anode chamber or the cathode chamber, as described in the cited application.

Those skilled in the art will recognize that the catalyst may be applied to the PCM 25 by applying a suspension containing the catalyst to PCM 25. As used herein the terms "anode face" and "cathode face" may refer to the catalyzed faces of the PCM 25, and shall include any residual catalyst materials that may remain on the surface of the PCM 25 as the result of such application.

As will be understood by those skilled in the art, electricity-generating reactions occur when a carbonaceous fuel mixture, including, but not limited to methanol or an aqueous methanol solution is introduced to the anode face 26 of the MEA, and oxygen, usually from ambient air, is introduced to the cathode face 27 of the MEA. The fuel mixture passes through channels in the flow field plate (or is present in the anode chamber 28), and/or a diffusion layer, and is ultimately presented to the anode face 26 of the PCM 25. Catalysts on the membrane surface (or which are otherwise present within the MEA 24) enable the anodic oxidation of the carbonaceous fuel on the anode face 26, separating hydrogen protons and electrons from the fuel and water molecules of the fuel mixture. Upon the closing of a circuit, protons pass through PCM 25, which is impermeable to the electrons. The electrons thus seek a different path to reunite with the protons, and travel through a load 31 of an external circuit, thus providing electrical power to the load 31. So long as the reactions continue, a current is maintained through the external circuit. The present invention describes techniques for preventing leakage through undesired paths in the DMFC as described herein. Direct oxidation fuel cells typically produce water ($H_2O$) and carbon dioxide ($CO_2$) as products of the reaction, which must be directed away from the catalyzed anode and cathode membrane surfaces 26, 27. The gas separator 32 separates the excess air and water vapor from the water. This water can be later directed to the pump 30 via a flow path 33. Those skilled in the art will recognize that the gas separator 32 may be incorporated into an existing component within the DMFC 21 or the DMFC system 20.

Figure 2:
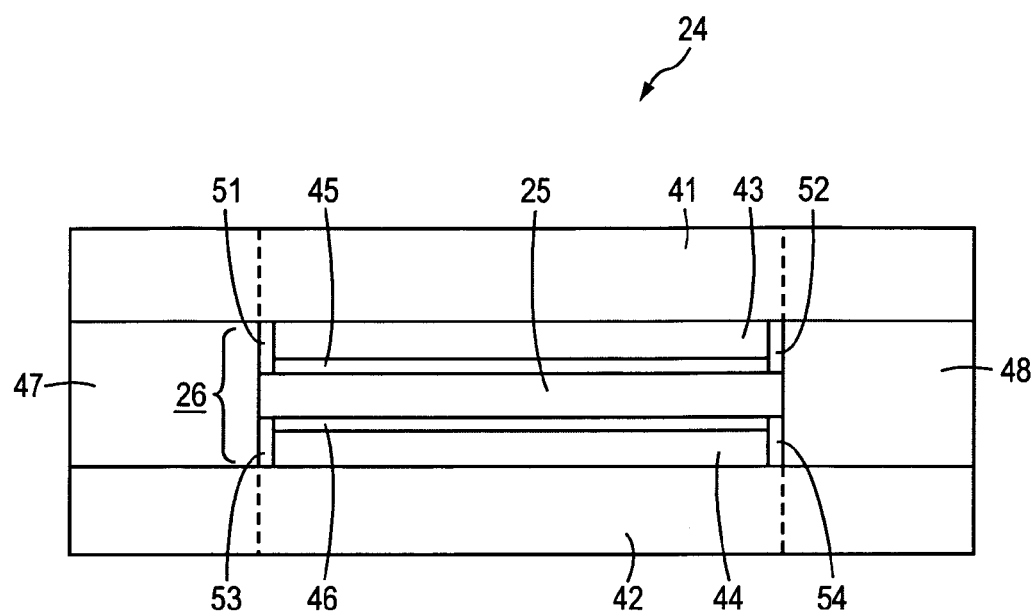
FIG. 2 is a cross-sectional diagram of a prior art device illustrating possible leakage paths.

FIG. 2 illustrates a prior art fuel cell portion 24 comprising a PCM 25 that is contained within an anode faceplate 41, (which may be part of a compression frame). The faceplate 41 has an opening (not shown) through which fuel is introduced to an MEA 26. A cathodic faceplate 42 allows oxygen from a suitable source to enter the cathode portion of the MEA 26. Beneath the faceplates 41, 42 are an anode diffusion layer 43, which is in contact with a catalyst coating 45 on the anode face of the PCM 25. The cathode diffusion layer 44 is in contact with the catalyst coating 46 on the cathode face of the PCM 25. It is noted that in this conventional design, the diffusion layers, and the catalyst layers are the same lengths. For example, anode diffusion layer 43 is the same length as the catalyst layer 45. Because of this arrangement of the diffusion layers 43 and 44, and the catalyst coatings 45 and 46, there are gaps between the MEA 26 and the faceplates 41 and 42. Typically, these gaps are sealed by gaskets 47 and 48. However, even with gasketing, smaller gaps 51, 52 on the anode side and gaps 53, 54 on the cathode side still remain. These gaps allow fuel to leak through to the cathode side, where it is wasted without generating electricity.

Figure 3:
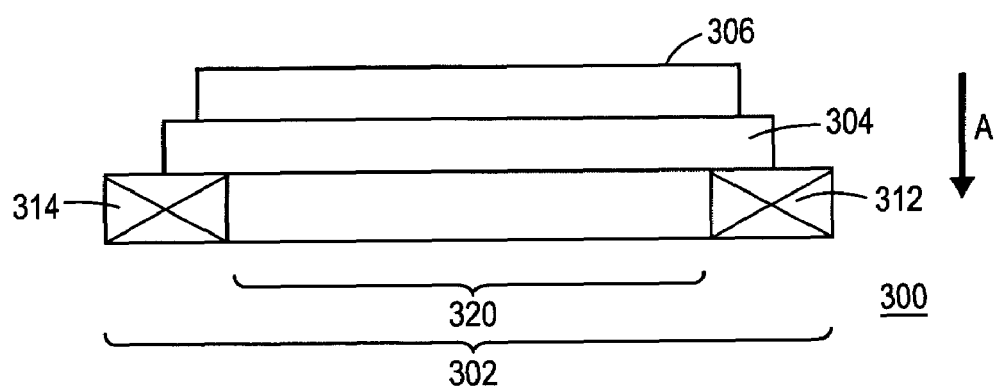
FIG. 3 is a schematic cross section of one embodiment of the invention in which a peripheral area of the PCM is chemically altered.

The present invention provides solutions to these disadvantages and a first aspect of the invention is illustrated in FIG. 3. FIG. 3 is the anode portion 300 of a membrane electrode assembly fabricated in accordance with the present invention. The anode portion 300 includes the PCM 302. The PCM 302 may be constructed of a protonically conductive, electronically non-conductive membrane. One example of which is NAFION®. NAFION®, as noted, is a cation exchange membrane based upon polyperflourosulfonic acid, which is available in a variety of thicknesses and equivalent weights.

A catalyst layer 304 is disposed on the NAFION® layer 302 using methods known to those skilled in the art, and the catalyst layer 304, as noted, may be a blend of platinum or ruthenium mixtures or alloys thereof. The top layer of the anode portion 300 of the MEA is an anode diffusion layer 306. The anode diffusion layer evenly disperses the fuel, which is directed towards the anode portion 300, as indicated by the arrow A, which fuel is reacted on the catalyst 304. The reaction produces protons, which pass through the protonically-conductive, electronically non-conductive membrane 302.

The overall length of the NAFION® membrane 302 is indicated by reference character 302. In accordance with the invention, the external borders of the NAFION® membrane 302 are rendered substantially impermeable to liquids by heating, ultrasonic treatments, chemically modifying the structure of the NAFION®, or coating the membrane with an impermeable material, for example. Impermeable portions 312 and 314, visible in FIG. 3 do not allow liquids, such as fuel or fuel and water, nor do they allow protons carried by liquid water to pass therethrough. Instead, the liquid and thus the protons pass through the reactive portion 320. We herein refer to this portion 320 of the NAFION® membrane 302 as the "permeable" portion of the membrane because it is permeable to liquids.

Figure 4:
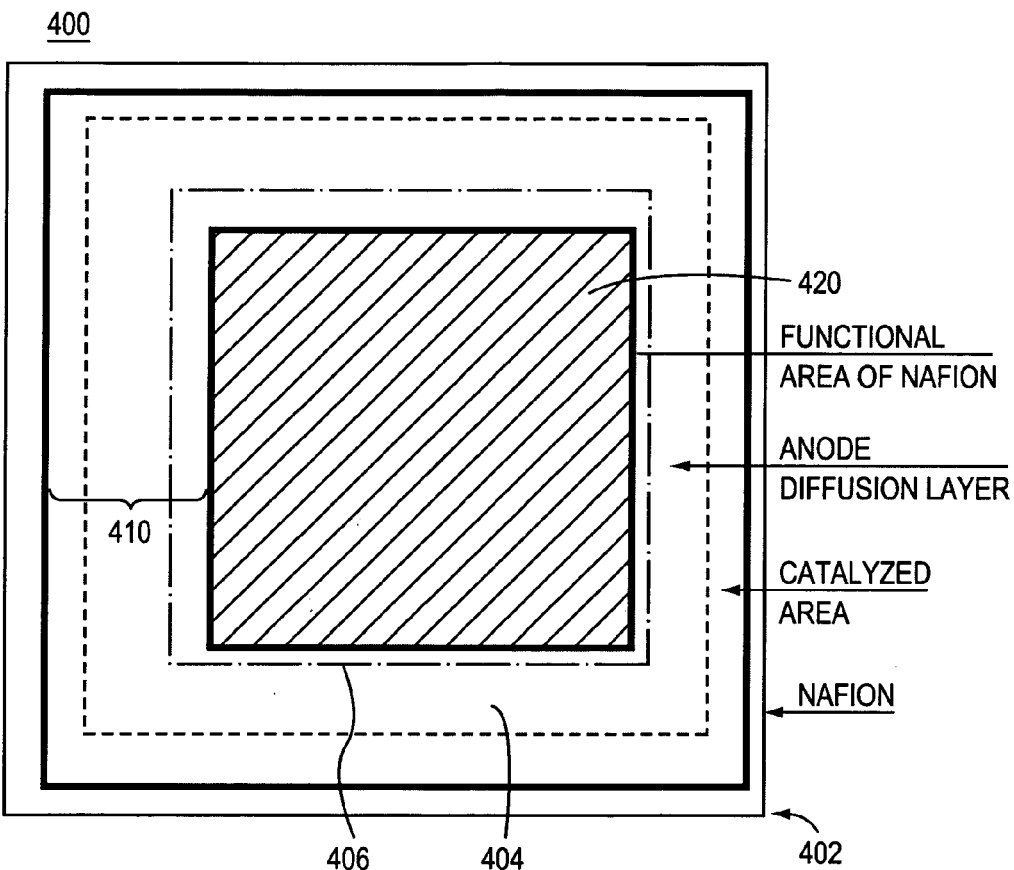
FIG. 4 is a schematic top plan view of a section of the component of FIG. 3.

This can also be understood with reference to FIG. 4, which is a schematic top plan view of the anode portion 400 of the membrane electrode assembly in accordance with the present invention. The anode portion includes a NAFION® membrane 402, and a catalyzed layer 404, which has been either particle deposited or coated onto the NAFION® membrane 402. The catalyzed layer 404 is indicated by the dashed lines. The anode diffusion layer 406 (illustrated in the dot-dash lines) evenly disperses the fuel across the relevant portion of the NAFION® membrane 402.

In accordance with the invention, the NAFION® membrane 402 is rendered substantially liquid impermeable and protonically non-conductive in an outer peripheral area 410 (shown between the bold lines in FIG. 4). This outer peripheral area 410 is rendered substantially liquid impermeable by heat treating, ultra sonic treatment techniques, chemical treatments including amine dipping, and the like, or otherwise modifying the NAFION®. This area 410 may, but need not, be rendered substantially protonically non-conductive by said heat treatment, or by using other processes known to those skilled in the art, including but not limited to amine dipping. This leaves the area 420 as the functionally active area of the NAFION®, at which fuel that passes through the anode diffusion layer 406 is catalyzed at the catalyst area 404, to generate protons that pass through the functional, permeable area 420 of the NAFION® membrane 402.

In addition to rendering the membrane border substantially liquid impermeable, a physical deterrent is also provided by the present invention in that the relative dimensions of the components are selected to aid in the prevention of leakage into undesired areas in a membrane electrode assembly. As illustrated in FIG. 3, for example, the catalyzed portion 304 is extended beyond the active or permeable area 320 of the NAFION® membrane 302. This assists in preventing leakage because fuel that diffuses through the portion of the diffusion layer 306, which extends beyond the active area 320, will be catalyzed but will not pass through the membrane. Thus, even though the fuel that is consumed by catalysis in those areas does not contribute to electricity-generating reactions, the fuel does not cross over the membrane and into the cathode area, which would otherwise lead to the negative consequences with respect to methanol cross-over, which have been discussed herein, such as wasting fuel and generating undesired heat on the cathode side of the fuel cell.

FIGS. 3 and 4 illustrate one embodiment of the invention. It should be understood, however, that the physical portion of the membrane that is rendered substantially impermeable may be of various geometric configurations, and the invention is not limited to an active area that is bordered on all sides by a rectangular impermeable area. There may be instances in which multiple or other geometric sections of the membrane are be rendered liquid impermeable, depending upon the particular application of the invention, and these variations are contemplated as being within the scope of the present invention.

Figure 5:
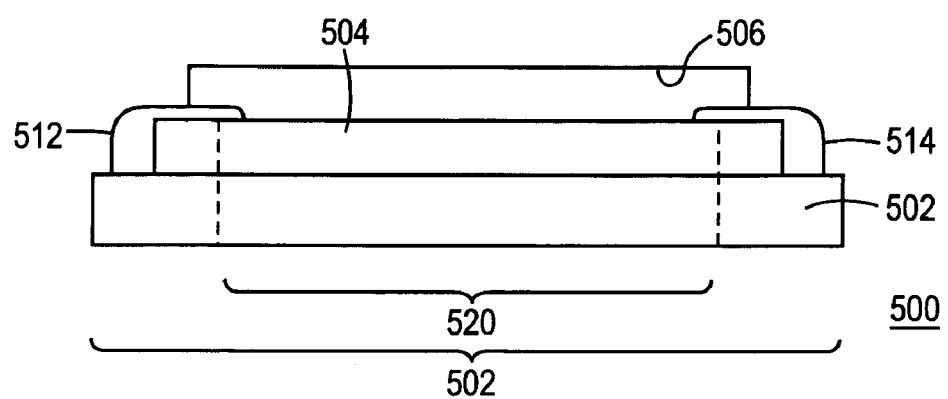
FIG. 5 is a schematic cross section of one embodiment of the invention in which a physical sealant is used in area of the catalyzed layer.

Another aspect of the invention is illustrated with respect to FIG. 5. FIG. 5 illustrates an anode portion 500 of a membrane electrode assembly that is fabricated in accordance with the present invention. The anode portion 500 includes a PCM 502, a catalyst layer 504 and an anode diffusion layer 506. Similar to that illustrated in FIG. 3, the catalyzed portion 504 is larger than the anode diffusion layer 506 so that fuel that is transported to the edges of, or around the edges of the anode diffusion layer 506 will still be consumed by catalysis. In accordance with this aspect of the invention, a fuel insulating material, such as TEFLON® is painted over the catalyst layer 504 onto the membrane 502 in a border area as illustrated in cross-section in FIG. 5. This produces two portions, 512 and 514, which are sealed against leakage laterally around the diffusion layer 506. In addition, both the catalyst layer 504 and the diffusion layer 506 are larger than the permeable, active area 520 of the membrane 502. Thus, fuel that diffuses through the anode diffusion layer 506 is catalyzed on an unsealed portion 520 of the catalyzed membrane 502, and contributes to the electricity generating reactions.

Figure 6:
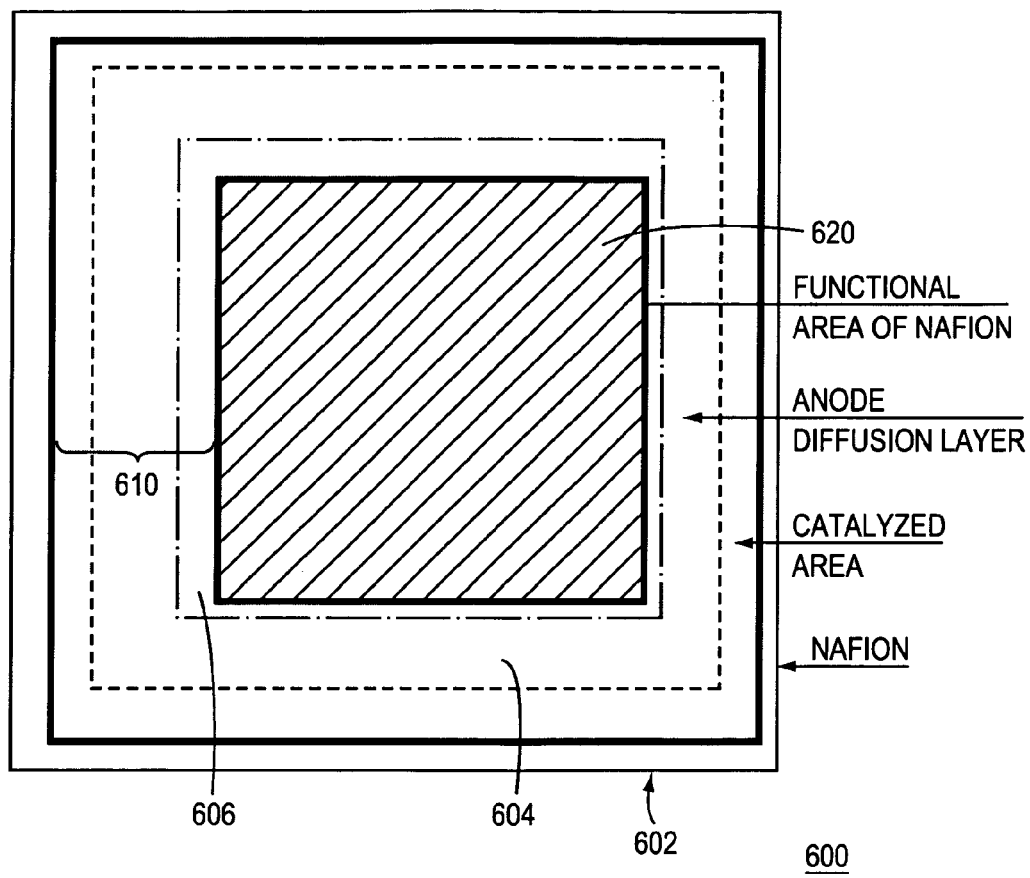
FIG. 6 is a schematic top plan view of a section of the component of FIG. 5.

A top plan view of this aspect of the invention is illustrated in FIG. 6. FIG. 6 illustrates the anode portion 600 of a membrane electrode assembly that is constructed in accordance with the present invention. The anode portion 600 includes a NAFION® membrane 602 that has a catalyzed area 604, indicated by the dashed lines and an anode diffusion layer 606 that is indicated in the dot-dash lines. In this instance, a TEFLON® or similar sealant is painted in an area on the membrane such that overlaps the catalyzed layer and seals the MEA between the diffusion layer 606 and the catalyzed area 604 to physically prevent leakage. This sealed area is generally designated by the reference character 610 and is indicated by the area between the bold lines. The sealed area 610 provides a physical barrier to leakage of fuel in and around the anode diffusion layer, which allows an functionally active area of NAFION® generally designated by the reference character 620. Even though in this embodiment the NAFION® membrane is chemically capable of conducting protons, the physical barrier still reduces waste of fuel because the protonic conductivity is dominated by through-plane transport and there is very little lateral conductivity. Once again, the invention is not limited to the embodiment shown in FIG. 6, instead there may be other portions of the membrane that are to be sealed, or the sealed area may take a different shape than rectangular while remaining within the scope of the present invention.

Figure 7:
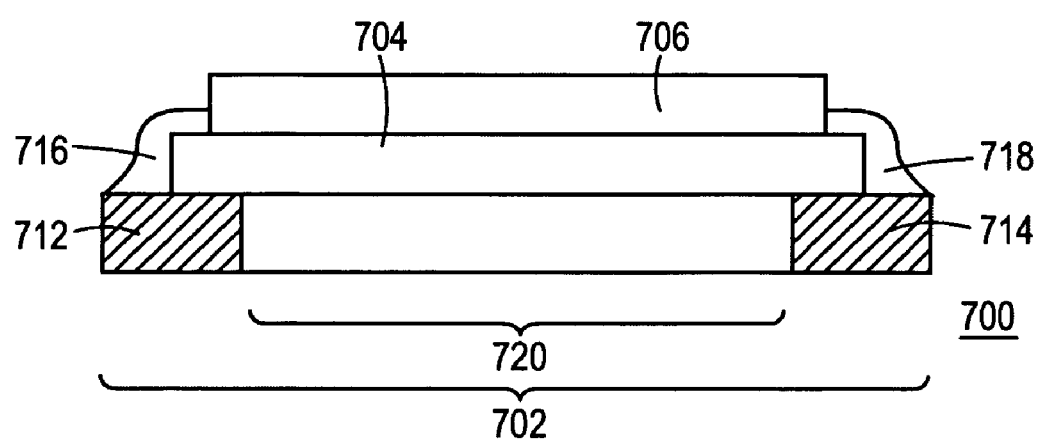
FIG. 7 is a schematic cross-section of another embodiment in which a number of the techniques of the present invention are combined.

Nevertheless, the chemical sealing techniques of the present invention can be combined with the physical sealing techniques of the present invention as illustrated in FIG. 7. FIG. 7 is a schematic side section of an anode portion 700 of a membrane electrode assembly, which is fabricated in accordance with the present invention. The anode portion 700 includes a PCM 702. The PCM 702 has a catalyzed layer 704 and an anode diffusion layer 706, associated therewith.

Similar to the embodiment of FIG. 3, a peripheral area of the PCM membrane 702 has been treated, in part, such that it is liquid impermeable. In the embodiment illustrated in FIG. 7, the liquid impermeable portion is an outer border, i.e., areas 712 and 714 resulting in a permeable area 720 that conducts protons in the manner which allows for normal operation of the fuel cell.

The membrane 702 has a catalyzed layer 704. In accordance with the invention, the length and/or width of the catalyzed layer 704 is selected so that it is longer than the permeable area 720 of the NAFION® membrane 702. This ensures that fuel leaking around the diffusion layer onto the outer borders of the diffusion layer is consumed by catalysis and does not cross over the membrane otherwise resulting in the negative consequences of methanol cross-over. A physical barrier is then placed over the borders of the catalyzed area 704. The physical barrier may be TEFLON®, which is impermeable to fuel, may be painted along the catalyzed aspect along the outer portion of the catalyzed layer of the membrane, and illustrated as portions 716 and 718. As an alternative to TEFLON® an insulating coating, such as a gasketing, could also be used for this physical barrier. Thus, the diffusion layer 706, is selected to be of a length smaller than the length of the catalyzed layer 704, to further resist leakage. Those skilled in the art will recognize that there are other means by which the peripheral areas of the NAFION® can be modified such that it is impermeable to fuel. These include those methods listed herein or other methods not listed, used singly or in combination.

Figure 8:
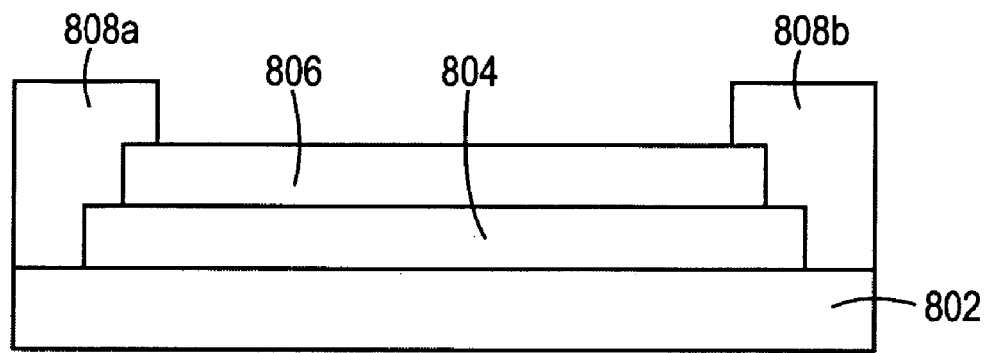
FIG. 8 is a cross-sectional diagram of another embodiment of the present invention with gasketing extending over the diffusion layers.

It is further possible to limit the flow of fuel by disposing a gasket or other component that physically impedes the passage of liquid fuel from the fuel source to the membrane electrolyte. Catalyst 804 is disposed between anode diffusion layer 806 and membrane electrolyte 802 (FIG. 8). Gaskets 808a and 808b are disposed in such a fashion that fuel cannot pass from the fuel source to the membrane electrolyte, other than through the anode diffusion layer 806 and catalyst layer 804. The gasketing is fabricated from silicone or other material which does not degrade in the presence of methanol, and which is compatible with fuel cell construction, including but not limited to elastomers and plastics. As shown in FIG. 8, Gaskets 808a and 808b extend to the large aspect of the anode diffusion layer which is opposite the membrane electrolyte 802, though a gasket which prevents the lateral transport of the fuel through the diffusion layer without covering a portion of large aspect of the anode diffusion layer is within the scope of the invention.

Those skilled in the art will recognize that these inventions may be implemented on the cathode aspect of the membrane electrolyte in order to achieve the goals of the invention.

These variations in constructing the membrane electrode assembly, in addition to blocking fuel cross-over, allow for a margin of error in the manufacturing process of the fuel cell as well. Other benefits to be derived from the invention include: reducing corrosion of other fuel cell components with which the fuel will have come in contact. This could also eliminate cross-cell shunt current when a mono-polar cell connection is used in the cell stack and achieves dimensional stability during wet-dry cycles and under compression.

The foregoing description has been directed to specific embodiments of the invention. It will be apparent, however, that other variations and other modifications may be made to the described embodiments, with the attainment of some or all of the advantages of such. Therefore, it is the object of the appended claims to cover all such variations and modifications as come within the true spirit and scope of the invention.

What is claimed is:

1. A membrane electrode assembly for use in an associated direct oxidation fuel cell, comprising:
   (A) a cathode portion comprising a cathode catalyst that is suitable for oxygen electro-reduction reactions;
   (B) an anode portion comprising an anode catalyst and an anode diffusion layer that is in contact with the anode catalyst layer;
   (C) a protonically-conductive, electronically non-conductive membrane (PCM) having an impermeable outer peripheral area that has been rendered substantially impermeable to liquid, wherein the PCM has a first side in contact with the anode catalyst and a second side in contact with the cathode catalyst;
   (D) wherein the anode catalyst is of a larger dimension than the anode diffusion layer and said anode catalyst and said anode diffusion layer are both of a larger dimension than the PCM having the impermeable outer peripheral area.

2. The membrane electrode assembly as defined in claim 1 wherein said impermeable area has been rendered substantially liquid-impermeable by heat treatment.

3. The membrane electrode assembly as defined in claim 1 wherein said impermeable area has been rendered substantially liquid-impermeable by ultrasonic treatment.

4. The membrane electrode assembly as defined in claim 1 wherein said impermeable area has been rendered substantially liquid-impermeable by a selected chemical treatment.

5. The membrane electrode assembly as defined in claim 4 wherein said selected chemical treatment includes amine dipping.

6. The membrane electrode assembly as defined in claim 1 further comprising a polytetrafluoroethylene coating disposed upon said anode portion, on a side of the anode portion that is opposite the anode catalyst.

7. The membrane electrode assembly as defined in claim 6 wherein said polytetrafluoroethylene coating is disposed along a peripheral area of said anode portion.

8. The membrane electrode assembly as defined in claim 1 further comprising an overlay film disposed between said anode portion of said PCM and said anode catalyst, said overlay film having at least a portion thereof that is liquid-impermeable.

9. The membrane electrode assembly as defined in claim 1 further comprising gasketing disposed along the peripheral area of said membrane electrode assembly.

10. The membrane electrode assembly as defined in claim 9 wherein said gasketing is disposed along a peripheral edge of said anode portion to seal said anode portion against lateral leakages.

11. The membrane electrode assembly as defined in claim 9 wherein said gasketing is disposed over said anode diffusion layer and said anode catalyst to seal said anode diffusion layer and said anode catalyst to said PCM.

12. The membrane electrode assembly as defined in claim 11 wherein fuel is delivered only to the portion of the anode diffusion layer that is exposed beyond said gasketing.

13. The membrane electrode assembly as defined in claim 12 further comprising an anode flow field plate which delivers fuel only to said exposed portion of said anode diffusion layer.

14. The membrane electrode assembly as defined in claim 1 wherein said PCM comprised substantially of a cation exchange membrane based upon polyperfluorosulfonic acid.

15. The membrane electrode assembly as defined in claim 1 wherein said impermeable area is substantially impermeable to liquids including water, fuel and water and fuel combinations.

16. The membrane electrode assembly as defined in claim 1 wherein an area of said anode portion is rendered substantially protonically non-conductive.

17. The membrane electrode assembly as defined in claim 9 wherein said gasketing that is disposed along the peripheral area of said membrane electrode assembly is substantially comprised of at least one of an elastomer and a polymer, including silicone.

18. The membrane electrode assembly as defined in claim 1 wherein said anode diffusion layer extends beyond said substantially impermeable portion of said anode portion such that fuel that travels through said extended portions of said diffusion layer will not pass through said anode portion.

19. A membrane electrode assembly for use in an associated direct oxidation fuel cell, comprising:
   (A) a cathode portion comprising a cathode catalyst that is suitable for oxygen electro-reduction reactions;
   (B) an anode portion comprising an anode catalyst and an anode diffusion layer that is in contact with the anode catalyst layer;
   (C) a protonically-conductive, electronically non-conductive membrane (PCM) been rendered substantially impermeable to liquid, wherein the PCM has a first side in contact with the anode catalyst and a second side in contact with the cathode catalyst;
   (D) wherein the anode catalyst is of a larger dimension than the anode diffusion layer and said anode catalyst and said anode diffusion layer are both of a larger dimension than the PCM having the impermeable outer peripheral area.

20. The membrane electrode assembly as defined in claim 19 further comprising:
   a cathode diffusion layer that is in contact with the cathode catalyst on said PCM.

21. The membrane electrode assembly as defined in claim 20 further comprising an anode current collector disposed in proximity to said anode diffusion layer, and a cathode current collector disposed in proximity to said cathode diffusion layer.

22. The membrane electrode assembly as defined in claim 21 further comprising a load coupled across said anode current collector and said cathode current collector to utilize power produced in electricity-generating reactions of the membrane electrode assembly.

23. The membrane electrode assembly as defined in claim 19 further comprising a functionally active area defined on said PCM and being of smaller dimensions than said anode diffusion layer such that fuel is delivered to said functionally active area.

24. The membrane electrode assembly as defined in claim 23 further comprising a flow field plate having flow field channels that deliver fuel to said functionally active area.

* * * * *